United States Patent
Thompson et al.

(10) Patent No.: US 9,736,137 B2
(45) Date of Patent: Aug. 15, 2017

(54) SYSTEM AND METHOD FOR MANAGING MULTIUSER TOOLS

(71) Applicant: SMART Technologies ULC, Calgary (CA)

(72) Inventors: Sean Thompson, Calgary (CA); Wendy Jean Segelken, Calgary (CA)

(73) Assignee: SMART Technologies ULC, Calgary (CA)

( * ) Notice: Subject to any disclaimer, the term of this patent is extended or adjusted under 35 U.S.C. 154(b) by 56 days.

(21) Appl. No.: 14/574,449

(22) Filed: Dec. 18, 2014

(65) Prior Publication Data

US 2016/0179335 A1 Jun. 23, 2016

(51) Int. Cl.
| | |
|---|---|
| *G06F 3/041* | (2006.01) |
| *G06F 3/0481* | (2013.01) |
| *H04L 29/06* | (2006.01) |
| *G06F 3/0487* | (2013.01) |
| *G06F 3/038* | (2013.01) |
| *G06F 3/0488* | (2013.01) |
| *G06F 3/0354* | (2013.01) |
| *G06F 21/32* | (2013.01) |

(52) U.S. Cl.
CPC ............. *H04L 63/08* (2013.01); *G06F 3/038* (2013.01); *G06F 3/03545* (2013.01); *G06F 3/041* (2013.01); *G06F 3/0487* (2013.01); *G06F 3/04817* (2013.01); *G06F 3/04883* (2013.01); *H04L 63/102* (2013.01); *G06F 21/32* (2013.01); *G06F 2203/0384* (2013.01); *G06F 2203/04803* (2013.01)

(58) Field of Classification Search
CPC ...... G06F 3/04812; G06F 3/041; G06F 3/016; G06F 3/03545; H04L 63/08
See application file for complete search history.

(56) References Cited

U.S. PATENT DOCUMENTS

| | | | | |
|---|---|---|---|---|
| 7,242,389 B1 * | 7/2007 | Stern | ...... | G06Q 10/10 345/158 |
| 2003/0090515 A1 * | 5/2003 | Chang | ...... | H04N 5/4401 715/745 |
| 2004/0225968 A1 * | 11/2004 | Look | ...... | G06F 3/0481 715/778 |
| 2004/0250218 A1 * | 12/2004 | Wecker | ...... | G06F 3/038 715/812 |
| 2007/0106950 A1 * | 5/2007 | Hutchinson | ...... | G09B 5/067 715/761 |
| 2007/0171273 A1 * | 7/2007 | Saleh | ...... | G06F 3/041 348/14.08 |
| 2010/0180210 A1 * | 7/2010 | Toyama | ...... | G06F 3/038 715/750 |

(Continued)

*Primary Examiner* — Ibrahim Khan
(74) *Attorney, Agent, or Firm* — Ridout and Maybee LLP

(57) ABSTRACT

The present invention relates to a method and system for managing multi-user tools for a workspace on a touch screen. Workspaces are generated for use with the touch screen and one or more of identifiable pointers are associated with them. A global tool element having a plurality of controls is generated and displayed on the touch screen. When more than one pointer is associated with one of the workspaces, redundant controls are removed from the global tool element and a local tool element is created for each associated pointer. The local tool elements comprise at least the redundant controls.

30 Claims, 9 Drawing Sheets

(56) References Cited

U.S. PATENT DOCUMENTS

2010/0261466 A1* 10/2010 Chang ................... G06F 3/1423
                                                    455/420
2011/0209097 A1*  8/2011 Hinckley .............. G06F 3/0483
                                                    715/863

* cited by examiner

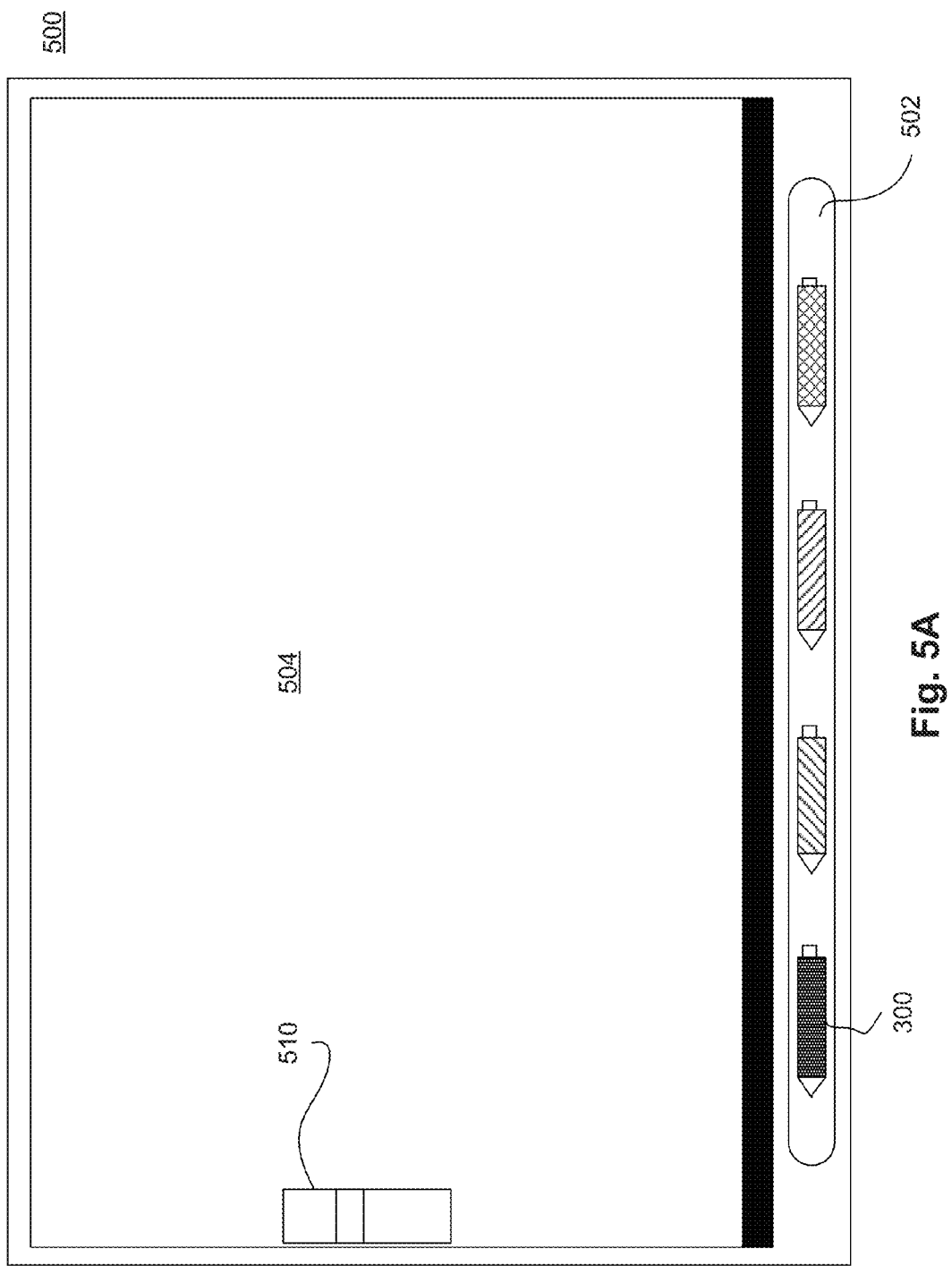

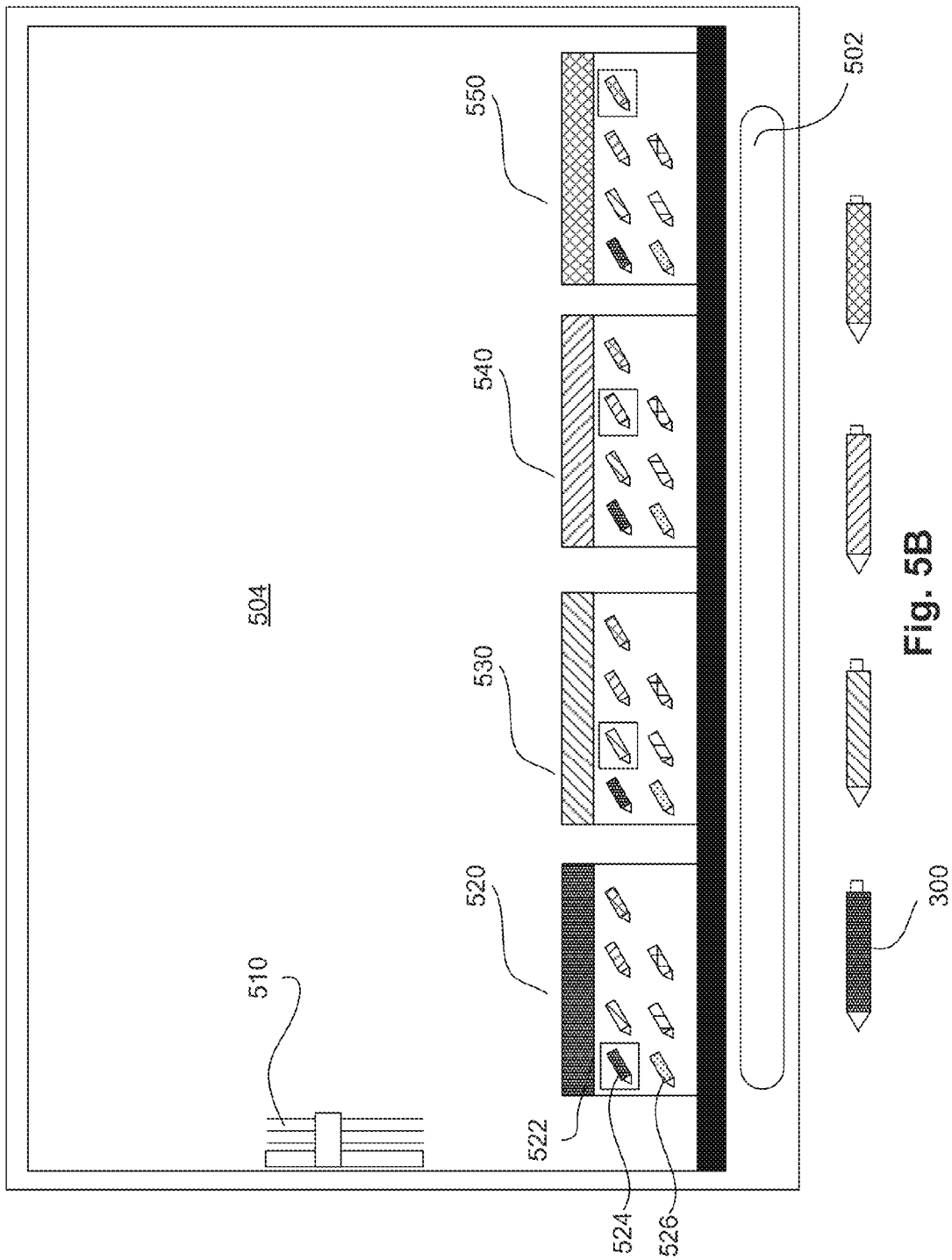

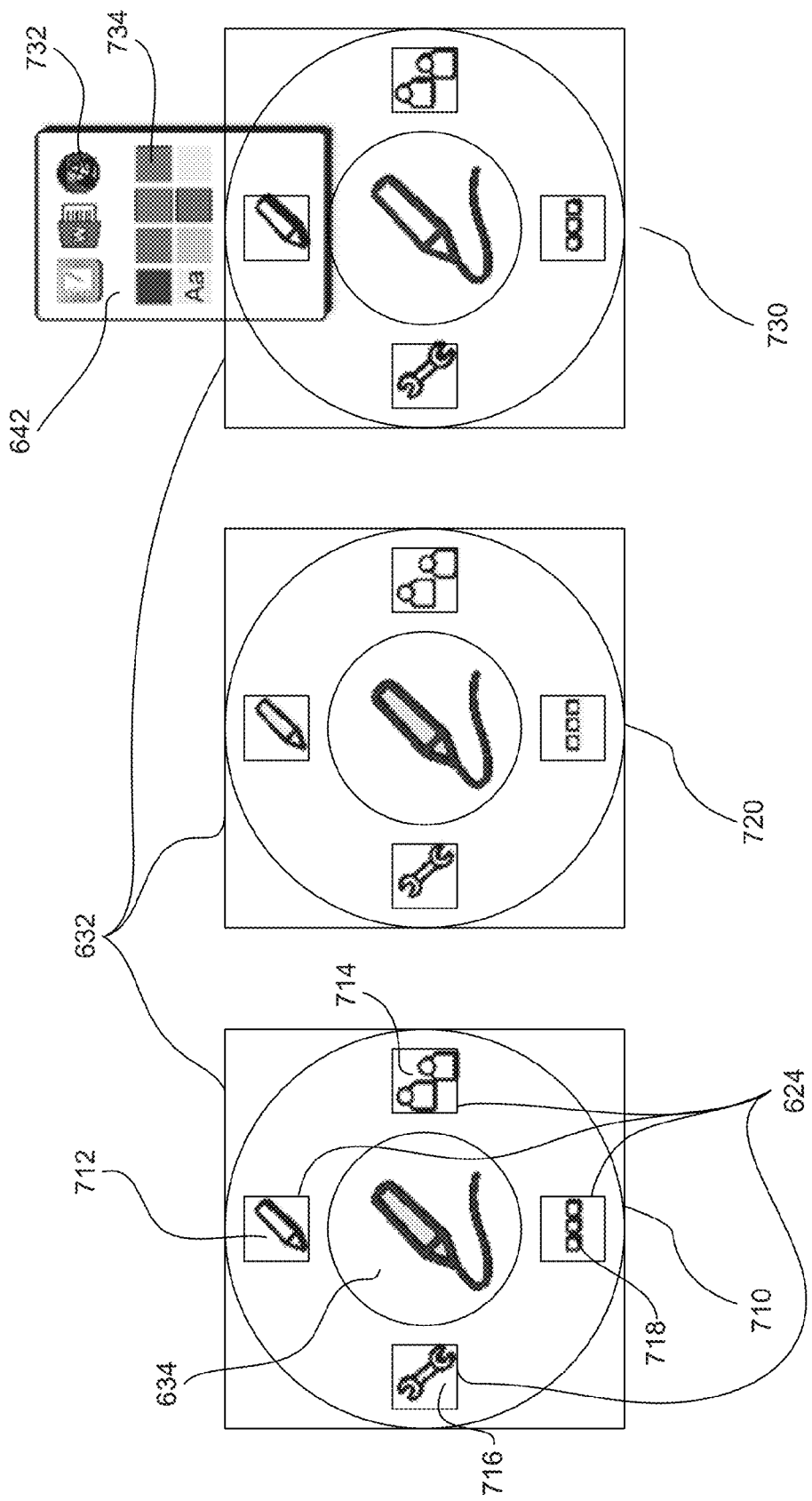

SYSTEM AND METHOD FOR MANAGING MULTIUSER TOOLS

RELATED APPLICATION

This application is related to U.S. patent application Ser. No. 14/467,104, filed Aug. 25, 2014, the contents of which are incorporated herein by reference.

FIELD OF THE INVENTION

The present invention relates generally to user interface tools for a computer screen. More particularly, the present invention relates to a method and system for managing multi-user tools for a workspace on a touch screen.

BACKGROUND OF THE INVENTION

With the increased popularity of multiuser large-screen human-computer interfaces, there is a need to provide user interface tools for each user while maximizing screen real estate. Furthermore, there is a need to manage how the interaction of each user is recorded to the workspace and subsequently recorded to each user's individual device, such as a smart phone or software platforms that provide a service remotely through the Internet. Such networked services have storage for user data and profiles in the "cloud" using services such as Facebook®, Google Cloud storage, Dropbox®, Microsoft OneDrive®, or other services known in the art.

Multiple users frequently wish to interact with large touch screen displays as input, such as interactive whiteboards, touch-enabled displays such as high-definition televisions (HDTVs), projectors, etc. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; 7,274,356; and 7,532,206 assigned to SMART Technologies ULC of Calgary, Alberta, Canada, assignee of the subject application, the entire disclosures of which are incorporated by reference; touch systems comprising touch panels or tables employing electromagnetic, capacitive, acoustic or other technologies to register pointer input; laptop and tablet personal computers (PCs); smart phones, personal digital assistants (PDAs) and other handheld devices; and other similar devices. Several methods of identifying individual users are known in the art and disclosed in the references below.

U.S. Pat. No. 7,532,206 to SMART Technologies ULC, the entirety of the specification incorporated by reference, discloses a touch system and method that differentiates between different passive pointers used to contact a touch surface so that pointer position data generated in response to a pointer contact with the touch surface can be processed in accordance with the type of pointer used to contact the touch surface. The touch system comprises a touch surface to be contacted by a passive pointer and at least one imaging device having a field of view looking generally across the touch surface. At least one processor communicates with the at least one imaging device and analyzes images acquired by the at least one imaging device to determine the type of pointer used to contact the touch surface and the location on the touch surface where pointer contact is made. The determined type of pointer and the location on the touch surface where the pointer contact is made are used by a computer to control execution of an application program executed by the computer.

United States Patent Publication No. 2011/0242060 to SMART Technologies ULC, the entirety of the specification incorporated by reference, discloses an interactive input system having at least one imaging assembly that captures image frames of a touch region. A pointer placed within the touch region modulates an emitted infrared light using a different combination of subcarrier frequencies that are captured in the image frames. A processing structure demodulates the captured image frames to determine frequency components thereof and examines the frequency components to determine at least one attribute of the pointer.

U.S. Patent Publication No. 2014/0137015 titled "Method and Apparatus for Manipulating Digital Content", the entirety of the specification incorporated by reference, assigned to SMART Technologies ULC discloses an interactive input system having a pen tool whereby removal of the pen tool from the tool tray conditions the Digital Signal Processor (DSP) controller to check if a modulated signal is output by the pen tool. If no modulated signal from the pen tool has been received, the controller simply remains in a ready state awaiting such a modulated signal. When the pen tool is brought into contact with the display surface, the pen tool emits a modulated signal that is received by the wireless unit connected to the DSP. The DSP checks to determine whether a specific attribute has been assigned to the pen tool, for example colour, or whether a default attribute has been assigned to the pen tool. The DSP controller then uses the modulated signal-to-pen tool mode mapping to determine whether the writing end or erasing end of the pen tool has been used to contact the display surface.

U.S. Pat. No. 6,498,590 to Dietz and further described in Dietz et al., "DiamondTouch: A multi-user touch technology," Proc. User Interface Software and Technology (UIST) 2001, pp. 219-226, 2001 discloses a multi-user touch system including a surface on which are a pattern of mounted antennas. A transmitter transmits uniquely identifiable signals to each antenna. Receivers are capacitively coupled to different users and are configured to receive the uniquely identifiable signals. A processor then associates a specific antenna with a particular user when multiple users simultaneously touch any of the antennas. Through identifying particular users, the system has the ability to generate virtual personal work areas. Although the system is designed for group collaboration on a common surface, in practice, individuals may want to "break away" to briefly address some subset of the problem, and then wish to integrate their result into the whole. When these situations arise, the system can generate a virtual personal work area in front of the appropriate user that only responds to that user. The user can then manipulate objects in this space, without impacting the larger work effort of other users but for the loss of some screen space. Because these virtual personal work areas are software defined, they can be generated and destroyed on the fly, in any shape as desired.

Many models of interactive whiteboards sold by SMART Technologies ULC under the name SMARTBoard™ that employ machine vision technology to register pointer input have a tool tray mounted below the interactive whiteboard surface that comprises receptacles or slots for holding a plurality of pen tools as well as an eraser tool. These tools are passive devices without a power source or electronics. When a tool is removed from its slot in the tool tray, a sensor in the tool tray detects the removal of that tool allowing the interactive whiteboard to determine that the tool has been selected. SMARTBoard™ software in turn processes the next contact with the interactive whiteboard surface as an action from the selected pen tool, whether the contact is from the selected pen tool or from another pointer such as a finger or other object. Similarly, when the eraser tool is removed from its slot, the SMARTBoard™ software processes the next contact with the interactive whiteboard surface as an erasing action, whether the contact is from the eraser tool, or from another pointer such as a finger or other object. Additionally, two buttons are provided on the tool tray. One of the buttons, when pressed, allows the user to execute typical "right click" mouse functions, such as copy, cut, paste, select all, etc. while the other button when pressed causes an onscreen keyboard to be displayed on the interactive whiteboard surface allowing users to enter text, numbers, etc. Although this existing tool tray provides satisfactory functionality, it is desired to improve and expand upon such functionality.

It is an object of the invention described herein to identify the user interacting with the interactive input device and provide an improved system and method of interaction with the multiuser touch screen.

SUMMARY OF THE INVENTION

According to one aspect of the invention, a computer system and a computer-implemented method for managing multi-user tools have a processor, a touch-enabled display and a memory unit. The memory unit stores instructions to configure the processor to generate a plurality of workspaces; detect a plurality of identifiable pointers; associate one of the pointers with one of the workspaces; generate a global tool element having a plurality of controls; display the global tool element on the touch-enabled display; associate another pointer with one of the workspaces. When more than one pointer is associated with one of the workspaces, redundant controls are removed from the global tool element and local tool elements, each having the redundant controls, are created. Each of the local tool elements correspond to each associated pointer. The plurality of controls could be one or more of a toolbar, a palette, or a radial tool; and wherein the toolbar, palette, and radial tool each has a plurality of control icons. The control icons could be changed based on the workspace corresponding to the associated pointer.

According to another aspect of the invention, the local tool elements are displayed, on the touch-enabled display, proximate to an initial contact of the associated pointer with the touch-enabled display. Alternatively, the local tool element is displayed proximate to a receptacle from which the associated pointer is stored. The local tool element could be moved on the touch-enabled display to a location where a predetermined gesture of the associated pointer is detected and the gesture could be a swipe across the edge of a bezel of the touch-enabled display. Optionally, the local tool elements could have an indicator that identifies the associated pointer.

Another aspect of the invention is the local tool element only accepts input from the associated pointer. Any modifications made by the associated pointer to the workspace corresponding to the associated pointer are stored in memory and could be periodically transferred to a content server.

According to yet another aspect of the invention, the workspace corresponding to the associated pointer could be changed in response to the associated pointer selecting a different workspace from a list of workspaces. Optionally, authentication could be performed prior to changing the workspace to the different workspace. The authentication could be one or more of: a security gesture, a security code, registering the associated pointer, or authorization from a pointer already associated with the different workspace.

Another aspect of the invention has the global and local tool elements recede from view (or increase or decrease in transparency) on the touch-enabled display based on the frequency of use by the associated pointer.

According to another aspect of the invention, a memory unit comprises instructions to configure a processor to associate at least one identifiable pointer with at least one workspace; generate a global tool element having a plurality of controls; display the global tool element on the touch-enabled display; and when more than one identifiable pointer is associated with the at least one workspace, create at least one local tool element for each associated pointer and display the local tool element on the touch-enabled display.

According to another aspect of the invention, the pointer could be passive by having markers on the exterior of the pointer that are identifiable to a sensor. Alternatively, the pointer could be active with a processor, memory, and an IR or wireless transceiver associated with the pointer that identifies the pointer during use. Also in another alternative, the pointer could have both passive markers and active elements.

BRIEF DESCRIPTION OF THE DRAWINGS

An embodiment will now be described, by way of example only, with reference to the attached Figures, wherein:

FIGS. 5A and 5B show a global toolbar and local toolbars on selection of one or more pointers;

FIG. 7A shows a radial tool having a plurality of selectable icons;

DETAILED DESCRIPTION OF THE EMBODIMENT

While the Background of Invention described above has identified particular problems known in the art, the present invention provides, in part, a new and useful application for user interface management.

Figure 1:
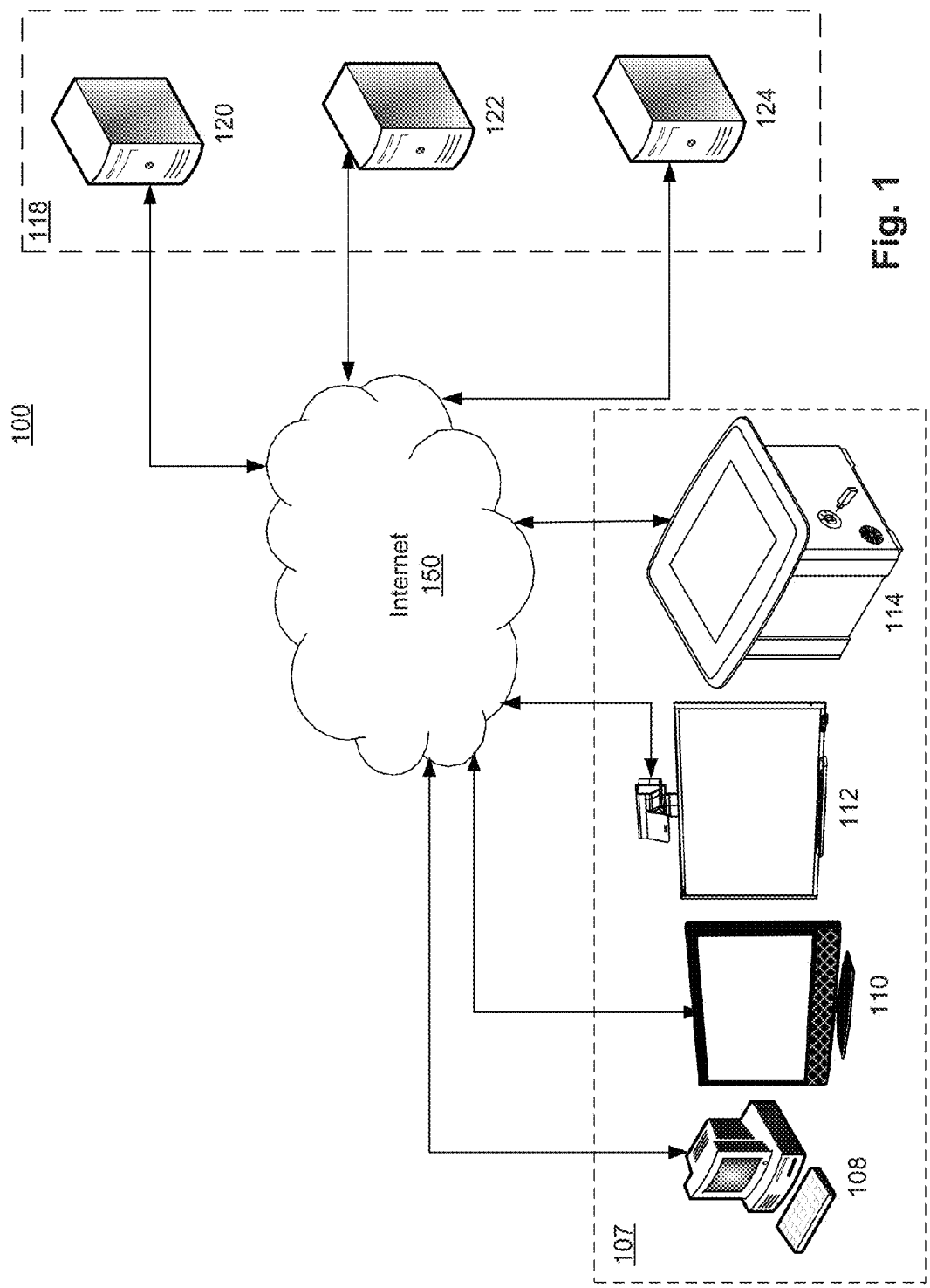
FIG. 1 shows a high-level architecture of a system for managing a user profile on a plurality of diverse devices.

FIG. 1 demonstrates a high-level hardware architecture 100 of the present embodiment. A plurality of computing devices 107 such as a personal computer 108, a flat screen display 110, an interactive whiteboard 112, or an interactive table 114 are also connected to the Internet 150. The system comprises an authentication server 120, a profile server 122, and a content server 124.

Turning now to the computing devices 107 and further described with reference to FIG. 2. The exemplary computing system 200 also has a processor 202 executing instructions from volatile or non-volatile memory collectively known as memory 204 and storing data thereto. The computing system 200 has a number of human-user interfaces such as a keypad or touch screen 206, an alternative input device 208 such as a microphone and/or camera, a speaker or headphones 210, and a display 212. A wired power supply 214 provides power to all the components of the computing system 200.

The computing system 200 has an input device including a keyboard and/or touch screen 206, and display 212. The keyboard could be sized for the user permitting them to type at an increased speed. The touch screen 206 and display 212 could be large and have functionality of being a multi-user, multi-touch screen. The keypad could be a conventional keyboard found on most desktop computers or a soft-form keyboard constructed of flexible silicone material. The keyboard could be a standard-sized 101-key or 104-key keyboard, a laptop-sized keyboard lacking a number pad, a handheld keyboard, a thumb-sized keyboard or a chorded keyboard known in the art. Alternatively, the computing system 200 could have only a virtual keyboard displayed on a touch screen 206. The touch screen 206 can be any type of touch technology such as analog resistive, capacitive, projected capacitive, ultrasonic, infrared grid, camera-based (across touch surface, at the touch surface, away from the display, etc), in-cell optical, in-cell capacitive, in-cell resistive, electromagnetic, time-of-flight, frustrated total internal reflection (FTIR), diffused surface illumination, surface acoustic wave, bending wave touch, acoustic pulse recognition, force-sensing touch technology, or any other touch technology known in the art. The touch screen 206 could be a single touch, a multi-touch screen, or a multi-user, multi-touch screen. Additionally, the microphone could be used for input into the computing system 200 using voice recognition.

The display 212 is typically a large-sized display for either presentation or collaboration with a group of users. The resolution is sufficiently high to ensure readability of the display 212 by all participants. The display 212 is typically sized to be approximately the same size as the touch screen 206. The user(s) controls the information displayed on the display 212 using either the touch screen 206 or the keyboard. The touch screen 206 of the present embodiment employs machine vision to detect one or more pointers brought into a region of interest in proximity with the touch surface. The touch screen 206 communicates with the processor 202 via a universal serial bus (USB) cable or other suitable wired or wireless connection. The processor 202 processes the output of the touch screen 206 and, if required, adjusts image data output to the display 212 so that the image presented reflects pointer activity. In this manner, the touch screen 206, processor 202, and display 212 allow pointer activity proximate to the touch screen 206 to be recorded as writing or drawing or used to control execution of one or more application programs executed by the processor 202.

The touch screen 206 is encompassed by a retro-reflective bezel extending generally normal to the plane of the touch screen 206. A pen tray 502 having receptacles size to receive pointers 300 could be fastened to the touch screen 206. Image assemblies accommodated within the bezel are positioned adjacent at least two corners of the bezel. The image assemblies look generally across the touch screen 206 so as to image any pointers 300 places proximate to the touch screen 206. Each image assembly comprises lens as well as two infrared (IR) light emitting diodes (LEDs) projecting light across the touch screen 206. One IR LED projects light through a filter having an IR-bandpass wavelength range of about 830 nm±12 nm and the other projects IR light through a filter having an IR-bandpass filter having a wavelength range of 880 nm±12 nm. Alternative embodiments have more than two IR LEDs, each with their own unique IR-bandpass filter range. Further details of the touch screen 206 and components thereof are described in U.S. 2013/0257825 to SMART Technologies, ULC, herein incorporated by reference. The location of each pointer 300 is determined through triangulation using at least two image assemblies.

The computing system 200 has a number of network transceivers coupled to antennas for the processor to communicate with other devices. For example, the computing system 200 could have a near-field communication (NFC) transceiver 220 and antenna 240, and/or a WiFi®/Bluetooth® transceiver 222 and antenna 242. The computing device also could have a wired network adapter 224 such as Ethernet to communicate with the Internet 150. The computing device could have a wired interface 230 such as USB for connection to and communication with other devices such as the mobile devices.

Figure 3A:
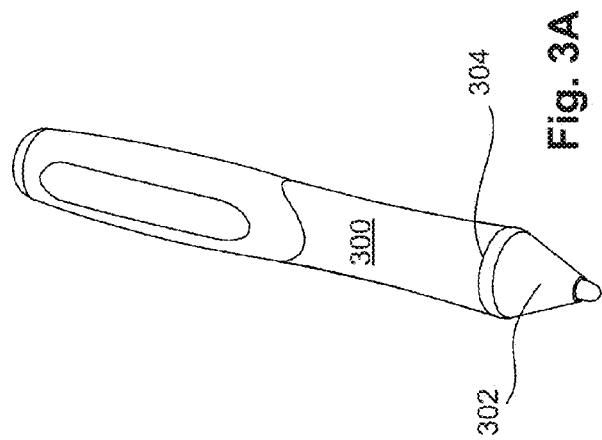
FIGS. 3A and 3B show a pointer and a marker on the pointer for an interactive input system.
Figure 3B:
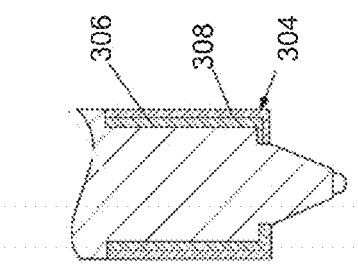

A pointer 300 of the present embodiment is shown in FIGS. 3A and 3B. The pointer 300 has a main body terminating in a conical tip 302 that is generally conical in shape. A filtered reflector 304 encircles the body adjacent the conical tip 302. The filtered reflector 304 comprises a retro-reflective element 306 and a filtering element 308 is an IR-bandpass filter with a bandpass wavelength of about 830 nm±12 nm. Another pointer 300 has similar construction and has an IR-bandpass filter with a bandpass wavelength of about 880 nm±12 nm. The touch screen 206 distinguishes between pointers by using each identifiable IR-band. Further details of this functionality are described in U.S. 2013/0257825 to SMART Technologies, ULC, herein incorporated by reference. The identifiable IR-band on the pointer 300 is associated with an account on the content server 124.

Figure 2:
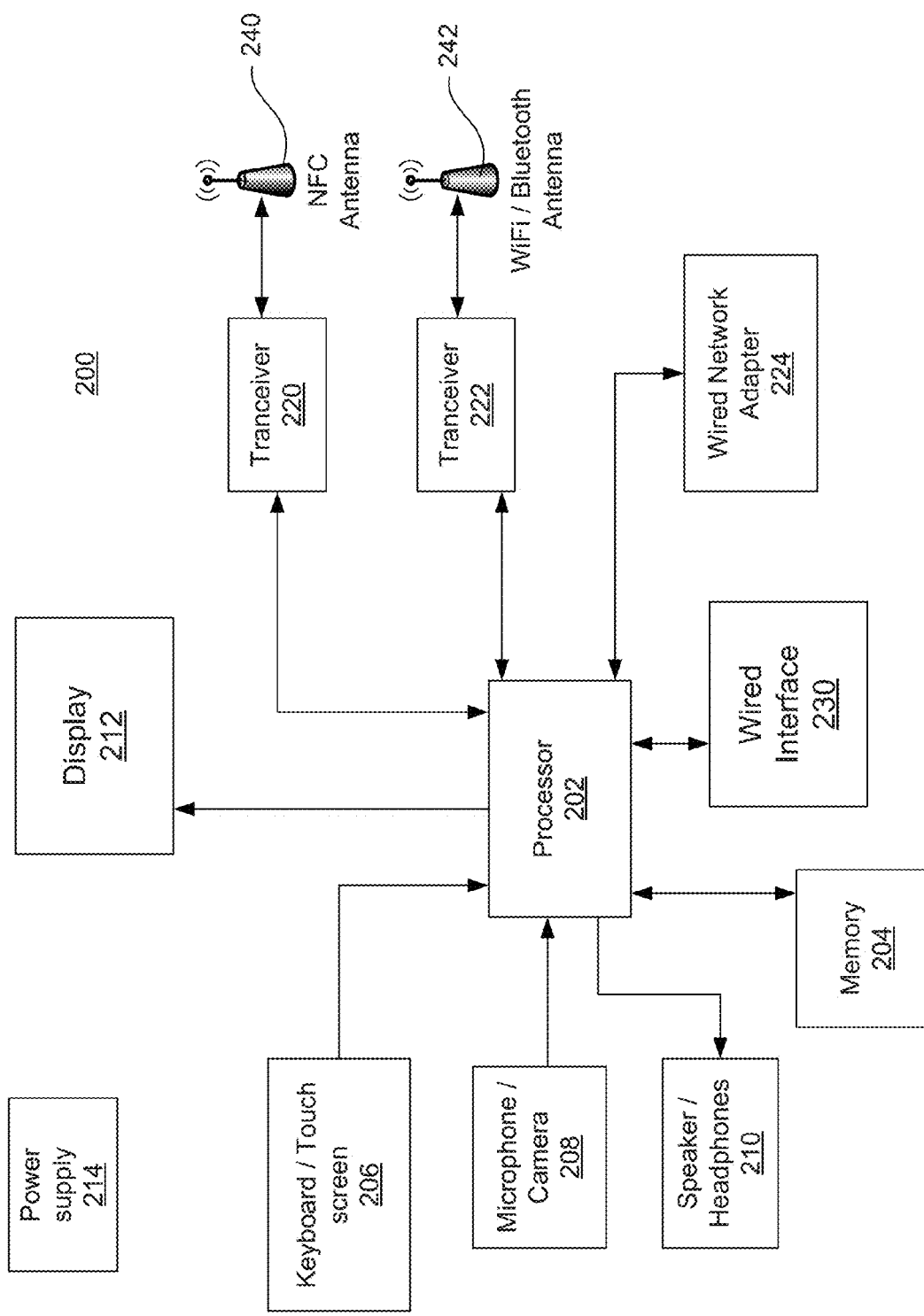
FIG. 2 shows an architecture of a computer system that could be used to implement various parts of the invention.

The servers 118 of the present embodiment have a similar structure to that described in FIG. 2 with respect to the computing system 200. The servers 118 have a processor 202 executing instructions from volatile memory or non-volatile memory collectively known as memory 204 and storing data thereto. The servers 118 could or could not have a keyboard, display 212, or wireless transceivers and antennas. The servers 118 communicate over the Internet 150 using the wired network adapter 224 to exchange information necessary for the present invention.

The users register themselves with the computing system 200 using a conventional username and password for authorization and/or authentication. The user information is transmitted to the authentication server 120 where the username and password are retrieved, optionally decrypted, and compared to the username and password on file for that account identifier. The computing system 200 receives authorization from the authentication server 120. The computing system 200 associates the identifiable IR bands on the pointer 300 with the username and account and workspace. The authentication server 120 notifies the profile server 122 that the computing system 200 is authenticated for the computing system 200. The profile server 122 transfers the profile information of the user over the Internet 150 to the wired network adapter 224 of the computing system 200 (step 484). A profile application executing on the processor 202 of the computing system 200 retrieves the profile information and based on the profile information, generates a workspace for the user (step 486). The workspaces could be a personal workspace or a collaborative workspace.

For a personal workspace, there is one master workspace layer generated and others contribute to that master workspace layer. This type of personal workspace could be suitable in an educational environment where the teacher is the primary user of the workspace but could allow others, such as students, to contribute to the master workspace layer. The teacher could have a pen that could be uniquely identified as having teacher access whereas the students' pens could be identified as having limited access or functionality. For a collaborative environment, each user has their own workspace layer where the users have uniquely identifiable pointers and are differentiated from each other. In such a system, the users have generally equal access to their own workspaces layers but could have limited access to other workspace layers. The workspace layer could occupy the entire display 212 and user interface of the computing system 200 or be a portion of the display 212 depending on whether or not other users are currently using the computing system 200. The workspace layer could optionally be displayed proximal to where the pointer 300 contacted the touch surface or touch screen 206.

Figure 4:
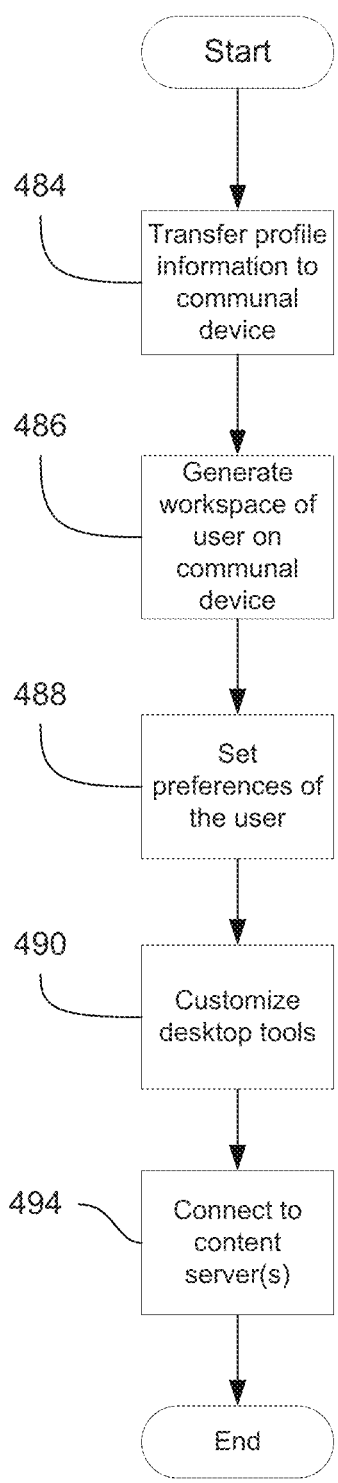
FIG. 4 shows a flowchart demonstrating a setup algorithm for a workspace layer.

Turning now to FIG. 4, profile information could contain workspace preferences of the user (step 488). For example, the workspace could be configured for a particular language, left or right handed orientation (and associated palm-reject module), default pen attributes such as pen colour, calligraphic pen, and the handwriting recognition engine operating on the processor 202 of the computing system 200 could be optimized for the user's penmanship and continues to learn idiosyncrasies of the user's penmanship. The computing system 200 modifies how the pointer 300 is interpreted to adjust the user interface accordingly. In an educational application, the workspace could be configured specific to a child grade level or the grade a teacher is teaching. The pointer identifier that initiated the workspace is associated with the workspace.

In an exemplary embodiment shown in FIG. 5A, an interactive whiteboard display 500 having a pen tray 502 displays the current workspace 504 and is associated with a pointer 300 rendering it active. Global tools 510 are generated and could be customized for the particular user (step 490). Persistent global toolbar, tools, or controls are generated as part of the global tools 510 for authoring content with any of the pointers 300. When only a single pointer 300 is associated with one or more of the plurality of workspaces, the global tools 510 include all the editing functionality. In an enterprise environment, the global tools 510 could be placed on the side of the display 212 of the computing system 200. In an educational environment, the global tools 510 are placed at the top of the display 212 of the computing system 200. The global tools 510 have actions that impact all users at the board such as zoom level, and/or inserting text. When one or no pointers 300 are registered with the display 212, the global tools 510 also include creation tools such as pens and highlighters, special tools, pen color, and shape drawing tools. The global tools 510 incorporate the functionality of a basic interactive display such as a interactive whiteboard display 500 having only a single pointer 300 or an interactive whiteboard display 500 with more than one pointer 300 but incapable of differentiating between them. In this instance, the system is limited to only the global tools 510.

If the interactive whiteboard display 500 has multiple pointers 300 registered with it and the system is able to differentiate between them, then this capability is reported to the processor 202. This capability enables the processor 202 to permit the global tools 510 to increase in functionality. When more than one pointer 300 is associated with the plurality of workspaces as more than one user picks up a pointer 300 from the pen tray 502 (or storage receptacle), the control icons of the global tools 510 recede (as shown as an animation in FIG. 5B), change, or fade by becoming more transparent by removing redundant controls and placing them into local toolbars 520 that are specific to each pointer 300. For example, the controls for pointer attributes such as colour of the ink are removed from the global tools 510 and placed into a local toolbar 520 for each pointer 300 that is uniquely identifiable. The local toolbar 520 for a particular pointer 300 is initially placed proximate to where the pointer 300 initially was picked up, where the pointer 300 initially contacts the display 212, or where a predetermined gesture is performed such as swiping from the bezel of the display 212. For example, the colour of the pointer 300 could be used as the indicator 522. The local toolbars 530, 540, and 550 have likewise functionality as local toolbar 520 and will not be further described. Any reference to the local toolbar 520 below can equally be applied to local toolbars 530, 540, and 550. In a system where the pointers 300 are uniquely identifiable, an indicator 522 corresponding to an attribute of the pointer 300 is displayed indicate to the user which pointer 300 the local toolbar 520 relates.

In an alternative embodiment, the local toolbar 520 could be moved to a different location by swiping outward from (or over) the bezel of the display 212 or by contacting the pointer 300 to the bezel of the display 212 and performing a predetermined gesture. This provides the advantage of allowing the user to move the local toolbar 520 quickly and easily to their location but being sufficiently different from normal gestures encountered during typical interactions with the work area. This difference reduces the likelihood that the system could misinterpret the user's intent. Alternative embodiments, the local toolbar 520 could be repositioned using the pointer 300.

When a pointer 300 is picked up, the creation tools in the global tools 510 are hidden (or disabled) and are displayed in the local toolbar 520 is placed above the where the pointer 300 was placed in the pen tray 502. The local toolbar 520 defaults the parameters of the creation tools therein to generally match the pointer 300 attributes. For example, if the pointer 300 that is black is picked up, then the default color 524 of the specific local toolbar 520 is also black. Selection on the local toolbar 520 is not tool-sensitive but in alternatives could be tool-sensitive only responding to the associated pointer. For example, a finger or a pointer 300 could be used to change selection. A slide up gesture on the top of the local toolbar 520 opens additional tools.

Figure 6:
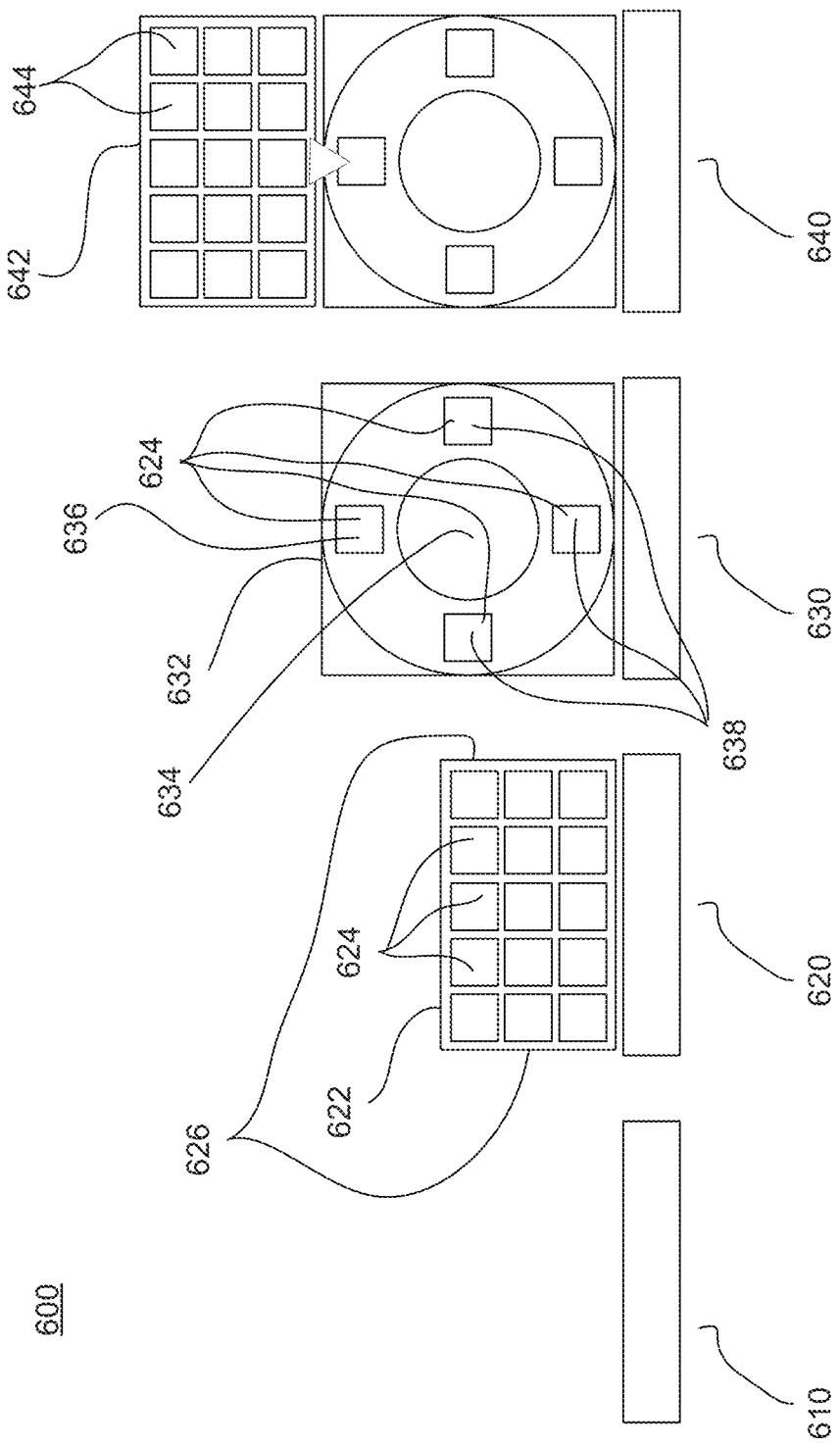
FIG. 6 shows toolbars having multiple different functionalities.

As shown in FIG. 6, the local toolbar 520 could comprise a base toolbar 610 and a number of different configurations 620, 630, and 640. The base toolbar 610 has a number of icons (not shown) that change the interpretation of the functionality of the pointer 300 by the interactive whiteboard display 500 or display 212. Swiping up from the top of the base toolbar 610 (or alternatively from any peripheral edge) opens a palette 622 having a plurality of icons or tool buttons 624 arranged in a grid. The palette 622 could have a number of different pages that are accessed by flicking around the periphery 626 of the palette 622. Alternatively, the local toolbar 520 is specific to the particular pointer 300 and could not be modified using any other pointer 300. When the pointer 300 contacts one of the tool buttons 624, the property of the pointer 300 is changed accordingly in memory 204 which causes the processor 202 to interpret the pointer 300 in a different manner.

In an alternative embodiment, swiping up from the top of the base toolbar 610 could display a radial tool 632 having tool buttons 624 similar to the palette 622. The radial tool 632 could be moved by dragging the center region 634. Tapping one of the tool buttons 624 results in the action associated with that selected button to execute such as changing the pointer type, addressing settings, changing profiles, opening an application, etc. When the top button 636 on the radial tool 632 is tapped (e.g. the button furthest from the base toolbar 610), an additional palette 644 corresponding to additional functionality is displayed. This additional palette 644 could optionally also be shown by tapping the center region 634 of the radial tool 632. Alternatively, the additional palette 644 is always shown.

Tapping the non-top buttons 638 causes selected button to rotate to the top position on the radial tool 632 and activates the functionality associated with the selected button. An example of this functionality is shown in FIG. 7A. The radial tool 632 is shown in three different states: recently used state 710, idle state 720, and active state 730. The tool buttons 624 in this example are pen mode 712, user selection 714, settings 716, and additional selections 718. The radial tool 632 changes transparency based on how recent one of the tool buttons 624 has been used by the associated pointer 300. When the radial tool 632 has had no interaction for 10 seconds, the radial tool 632 enters the idle state 720. The idle counter does not initiate counting if the palette 644 is open. When in the idle state 720, the tool buttons 624 are 50% opaque. The center region 634, with a constant 30% opacity when nothing is active, is used to drag the radial tool 632 around the screen. The tool buttons 624 on the outer circumference are for function selections. When recently used state 710, the tool buttons 624 are 100% opaque. When active state 730, the center region 634 and the tool buttons 624 are 100% opaque. In the active state 730, the additional palette 642 is displayed. In this palette 642, recently used applications are shown as a row of icons 732. Additionally, since the ink option of the pen mode 712 is selected, a plurality of colours 734 are shown that the user could select.

Figure 7B:
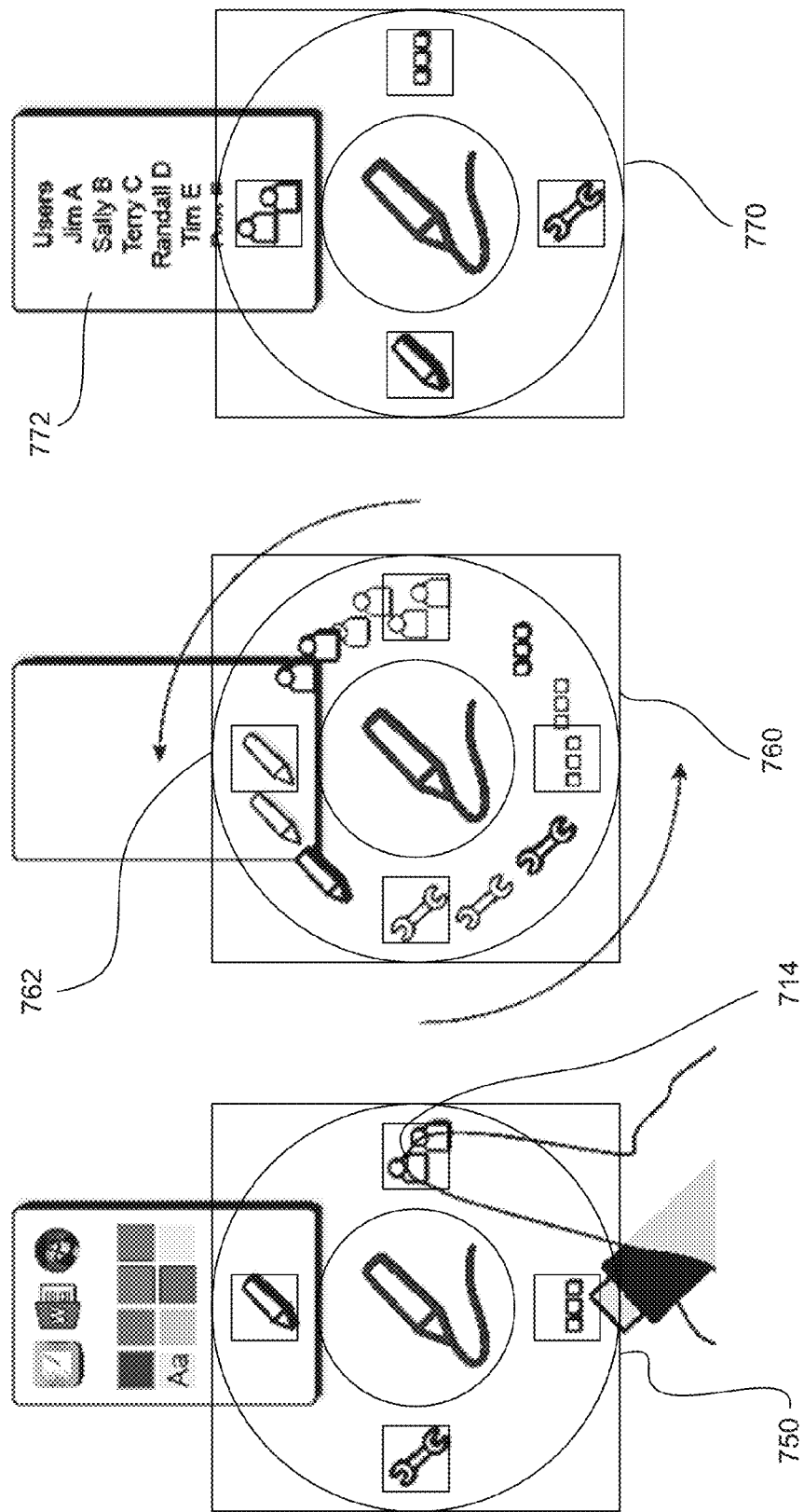
FIG. 7B demonstrates an animation of a radial tool and subsequent display of a layer or workspace list.

Turning now to FIG. 7B, when one of the tool buttons 624 is selected as shown in 750. The selected icon (in this case the user selection 714) rotates to the top 762 of the circle of radial tool 632 in an animation shown in 760. Following the animation of tool buttons 624, an options list 772 is displayed. The user is able to select a different user layer (or virtual workspace) from the options list 772 associated with the pointer 300. This workspace could also correspond to a particular function such as "electrical" or "mechanical" on engineering drawings. Certain workspaces could be secured dependent on the sharing settings of each layer. Beside each workspace on the options list 772, an icon could be displayed indicating which pointer(s) 300 is (are) currently associated with the workspace. The icon could be the colour corresponding to the pointer colour or could be another attribute such as an icon associated with the user of the pointer 300. Optionally, when the user selects a different workspace, the display could present a request for a password. The password could be a gesture, input from an on-screen keyboard, other type of password or could be determined by the prior registration of the pointer 300 with the display 212. If the workspace is already associated with other pointers 300, the other pointers 300 could be asked to confirm sharing with the new pointer. When an idle workspace is selected, the selected workspace is placed in an active state where modifications such as annotations and editing are stored in the selected workspace by the associated pointer 300.

The capabilities of the user interface could be linked with the currently selected user layer or workspace. For example, when the user selects the "mechanical" layer, annotation tools are customized in the palette 622 and 644 and the radial tool 632 that relate to modifying mechanical drawings. Alternatively, if the user selects the "electrical" layer, annotation tools are customized to be tools related to electrical drawing in the palette 622 and 644 and the radial tool 632. This is just a few examples; the inventor contemplates that other tools could be added based on the work environment such as for example, teacher tools and student tools.

In addition to configuring the settings of the workspace, the workspace connects to the content server 124 using usernames and passwords obtained from the profile information (step 494). The content server 124 is a network server or servers that contain the user's documents. Additional settings could be stored in the memory of the content server 124 that are large in size that it would delay the initialization of the workspace. For example, the user could have a customized dictionary or word listing for frequently misspelled words that is not necessary during initialization but is useful during subsequent interaction. The content server 124 could be a dedicated server of which the user has ownership or could be a network storage service such as Dropbox, OneDrive, GoogleDrive, Box.net, SharePoint, Citrix, Facebook, Evernote, a local or web-based network storage, etc. The network server and requisite API could be obtained from content server 124.

Subsequent interaction with the workspace layer and documents therein is automatically synchronized using a synchronization engine executing by the processor 202 of the computing system 200 in conjunction with a synchronization engine executing on the content server 124. The synchronization of documents could be performed using operational transformation guaranteeing that everyone editing the particular document is viewing the same version of the document. The changes are sent from the computing system 200 to the content server 124, and then to the other computing systems 200 that could also be editing the particular document. Each computing system 200 transforms the incoming changes so that they are consistent relative to the local version of the document. The inventor contemplates that other conflict resolution methods could be used for editing of shared documents.

If additional users desire to interact with the computing system 200, each user selects a different pointer 300 and a workspace layer is generated for each pointer 300 and is presented on the display 212. Ink written by the pointer 300 to the associated workspace layer is saved to the content server 124. The workspace layers receive the modifications of shared annotations and upload them to the associated account stored on the content server 124. In a shared environment, it could become confusing if each user has the same ink properties. As each pointer has a unique identifier that is identified during interaction with the computing system 200, any digital ink is associated with the unique identifier and the ink could be customized such as using a different colour or style unique to that user's account. In cases where two accounts have their preferences set to the same colour and style, the computing system 200 could automatically select another colour and/or style.

The shared environment also enables workspaces to be shared with one or all of the other users by changing sharing settings within their own workspace. These setting are locked to the particular pointer 300 associated with the workspace in order to prevent other users from changing the sharing settings inadvertently or maliciously. When the workspace is shared with another pointer 300, the ink of that pointer 300 is recorded to the workspace and updated on the content server 124 along with the user identifier. If the workspace is not shared with the pointer 300, then all ink from that pointer 300 is ignored in that workspace and optionally a message notifying the user of the pointer 300 is presented. In one embodiment, the global tools 510 list all of the current users with a workspace on the display 212. By selecting a user from the list, this enables or disables viewing of that particular user's annotations or modifications.

When the user is finished their session on the computing system 200, the user selects a virtual button in their workspace. On selection of the virtual button, the current state of all documents is saved to the content server 124. If there is only a single generic workspace is in operation without an associated profile or account, then the user is prompted for a location to save all valid annotations or modifications. If a specific user is operating a workspace, the user could choose to save with all annotations, or just their annotations. When more than one user is operating the computing system 200, then the annotations are saved to their respective workspaces or alternatively, the user could choose to save annotations of the other users if permissions permit. Any changes to the workspace settings are saved to the profile server 122. If the user is part of a collaborative session with other users, the user quitting is notified that changes made following the termination are not saved to the content server 124. The connections to the content server 124 and the profile server 122 are terminated. The processor 202 of the computing system 200 then wipes all record of the user's workspace from the memory 204. Alternatively, the computing system 200 retains all or a portion of the profile information and authentication information in memory 204. The retained profile and authentication information could be used for subsequent logins in order to increase the speed of login and association of the pointer 300 with the computing system 200.

If the pointer 300 is lost, the local toolbar 520 associated with that toolbar could be minimized or closed using a finger by performing a gesture on it such as a long hold or swiping it off the display 212.

Figure 8:
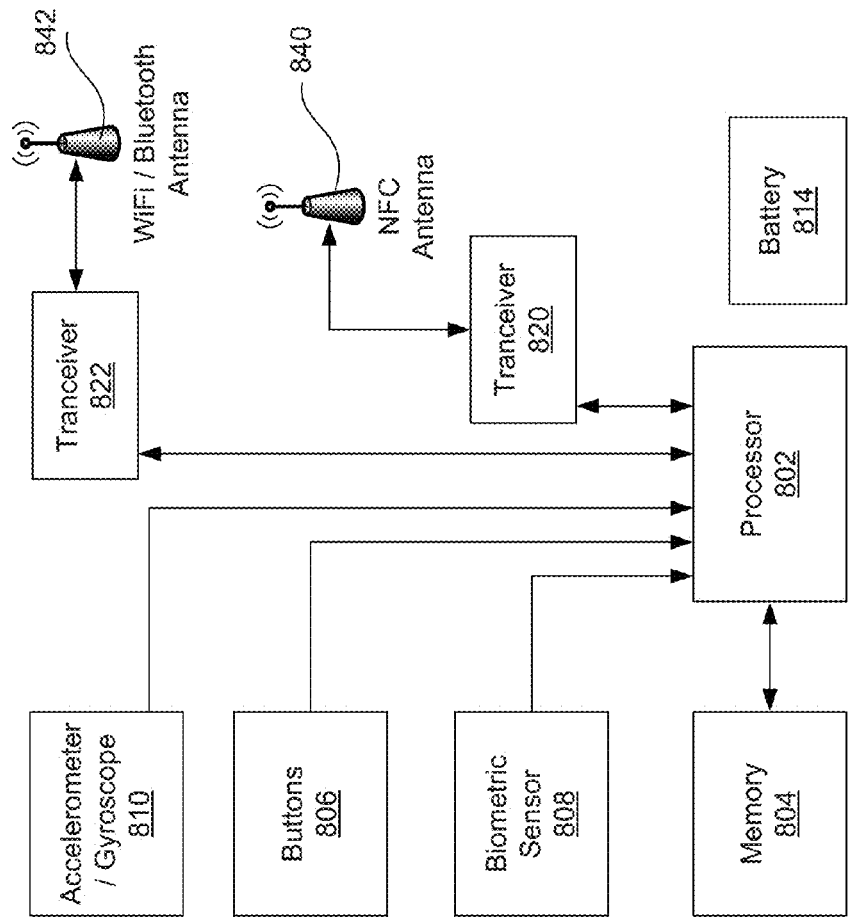
FIG. 8 shows an architecture of an active pointer.

Although the embodiments described herein are directed to a pointer 300 that is passive, the inventor contemplates that this invention could also be used with a more full-featured pointer which has components as shown in FIG. 8. The pointer 300 has a processor 802 executing instructions from volatile memory or non-volatile memory collectively known as memory 804 and storing data thereto. A battery 814 supplies power to all the electrical and electronic components of the pointer 300 and could be rechargeable or non-rechargeable and replaceable. The pointer could have buttons 806 allowing the user to change characteristics of the pointer 300 such as virtual ink colour, style, or to initiate pairing between the pointer and a particular computing system 200. The pointer 300 also could have a biometric sensor 808 such as a fingerprint scanner, iris scanner, voice recognition, facial recognition, electrocardiogram signal recognition, electromyogram signal recognition, electroencephalogram signal recognition, signature/handwriting recognition, vein recognition, or any combination thereof. In the instance of a fingerprint scanner, the biometric sensor 808 could be located on the barrel of the pointer 800 corresponding to where the user typically grips the pointer 300. The fingerprint scanner could also scan a plurality of fingers to identify the user. The pointer 300 could also have an accelerometer and/or gyroscope 810 which could be used for signature/handwriting recognition as well as to improve general handwriting recognition. Moreover, the accelerometer/gyroscope 810 could also be used to improve the quality of the digital ink based on the pitch, yaw, and/or rotation of the pointer 300. The pressure on the pointer 300 could also be used to modulate the thickness of the digital ink. Optionally, the pointer 300 has a transceiver 820 coupled to an NFC antenna 840 for pairing and communicating between the pointer 300 and a particular computing system 200. Furthermore, the pointer 300 could have a transceiver 822 coupled to a WiFi or Bluetooth antenna 842 in order to communicate accelerometer/gyroscope 810, button 806, biometric sensor 808, or battery status information to the computing system 200. The pointer 300 has a unique identifier stored within the memory 804 thereof. The pointers 300 could be authenticated with the computing system 200 as described in U.S. Ser. No. 14/467,104, herein incorporated by reference.

Another alternative could be each pointer having a unique radio frequency identification (RFID) tag within that allows a RFID reader to determine the pointer.

Although the embodiments described herein relate to a pointer 300 that is identifiable using an IR-band, the inventor contemplates that any touch screen 206 capable of unique identification of pointers 300 could implement the present invention. For example, the pointers 300 could be uniquely identifiable by the systems and methods as described in U.S. Publication No. 2013/0100022; U.S. Pat. No. 7,532,206; U.S. Publication No. 2011/0169727; and U.S. application Ser. No. 14/452,882, all of which are assigned to SMART Technologies ULC, and all of which are herein incorporated by reference.

If the interactive whiteboard display 500 system is able to determine the difference between the writing end and the erasing end of the pointer 300, then optionally, the tool buttons 624 could change. For example, when the eraser end of the pointer 300 contacts the display 212, the creation toolbar changes to an editing toolbar. The editing toolbar allows the user to select different eraser sizes. After selection, the editing toolbar could be automatically hidden. The eraser could also select additional editing items such as cut, copy, paste, etc. by dragging up from the top of the local toolbar 520.

Alternatively, in other embodiments, there are no users but rather a number of layers. The drawing system associates the layers with the pointer 300 using the toolbar associated with the pointer 300. During the time the pointer 300 is associated with a layer; all annotations recorded could be recorded to that particular associated layer.

Although the embodiments described herein show a computing system 200 with an active display, the inventor contemplates that the display could be passive such as, but not limited to, a dry erase board, chalkboard, paper flipchart, or a magnetic drawing board. Any writing on the passive board could be relayed in real-time to the computing system 200 and/or the content server 124.

Although the embodiments described herein have the workspace being set up using the profile information by the computing system 200, the inventor contemplates that the workspace is transferred from either the profile server 122 or the content server 124 as a virtual machine which is executed on the computing system 200. Alternatively, the workspace could be a remote desktop running on the content server 124 where the content server 124 is running a virtual machine corresponding to the user's account.

Although the servers (authentication server 120, profile server 122, content server 124) are described herein as discrete servers, other combinations could be possible. For example, the three servers could be incorporated into a single server, or there could be a plurality of each type of server in order to balance the server load.

The above-described embodiments are intended to be examples of the present invention and alterations and modifications could be effected thereto, by those of skill in the art, without departing from the scope of the invention, which is defined solely by the claims appended hereto.

What is claimed is:

1. A computing system to manage multi-user tools comprising:
    a processor;
    a touch-enabled display;
    a tangible computer-readable memory comprising instructions to configure the processor to:
        generate a plurality of workspaces;
        detect a plurality of identifiable pointers;
        identify an infrared band on each of the plurality of identifiable pointers and assigning a pointer identifier to each of the plurality of identifiable pointers;
        associate one of the pointers by assigning one of the plurality of pointer identifiers to an account of one of the workspaces;
        generate a global tool element having a plurality of controls for authoring content with any of the plurality of identifiable pointers;
        display the global tool element on the touch-enabled display;
        associate another pointer by assigning another one of the pointer identifiers to another account of one of the workspaces; and
        when more than one pointer is assigned to one of the workspaces, automatically remove redundant controls from the global tool element and create local tool elements each having the redundant controls, and each local tool element responding only to the assigned pointer identifier.

2. The computer system to manage multi-user tools according to claim 1, the tangible computer-readable memory further comprising instructions to configure the processor to: display, on the touch-enabled display, the local tool element at an initial contact point on the touch-enabled display of the assigned pointer.

3. The computer system to manage multi-user tools according to claim 1, the tangible computer-readable memory further comprising instructions to configure the processor to: display, on the touch-enabled display, the local tool element above a receptacle from which the assigned pointer is stored.

4. The computer system to manage multi-user tools according to claim 1, the tangible computer-readable memory further comprising instructions to configure the processor to: move the local tool element on the touch-enabled display to a location after a predetermined gesture of the assigned pointer is detected at the location.

5. The computer system to manage multi-user tools according to claim 4, wherein the predetermined gesture is a swipe across an edge of a bezel of the touch-enabled display.

6. The computer system to manage multi-user tools according to claim 1, wherein the tangible computer-readable memory further comprising instructions to configure the processor to: store, to the tangible computer-readable memory, modifications made by the assigned pointer to the associated workspace corresponding to the assigned pointer.

7. The computer system to manage multi-user tools according to claim 6, wherein the tangible computer-readable memory further comprising instructions to configure the processor to: periodically transfer the modifications stored in the tangible computer-readable memory to a content server.

8. The computer system to manage multi-user tools according to claim 1, wherein the tangible computer-readable memory further comprising instructions to configure the processor to: change the workspace corresponding to the assigned pointer in response to the assigned pointer selecting a different workspace from a list of workspaces.

9. The computer system to manage multi-user tools according to claim 8, wherein the tangible computer-readable memory further comprising instructions to configure the processor to: authenticate the assigned pointer with the different workspace prior to changing the workspace to the different workspace.

10. The computer system to manage multi-user tools according to claim 9, wherein the assigned pointer is authenticated by authorization from a pointer already assigned to the different workspace.

11. The computer system to manage multi-user tools according to claim 1, wherein the tangible computer-readable memory further comprising instructions to configure the processor to: cause the global tool element and the local tool elements to recede from view on the touch-enabled display based on a frequency of use by the assigned pointer having the pointer identifier.

12. The computer system to manage multi-user tools according to claim 1, wherein the tangible computer-readable memory further comprising instructions to configure the processor to: cause the global tool element and the local tool elements to increase or decrease transparency on the touch-enabled display based on a frequency of use by the assigned pointer.

13. The computer system to manage multi-user tools according to claim 1, wherein the plurality of controls comprise at least one of a toolbar, a palette, or a radial tool; and wherein the toolbar, palette, and radial tool each has a plurality of control icons.

14. The computer system to manage multi-user tools according to claim 13, wherein the plurality of control icons change based on the workspace corresponding to the assigned pointer.

15. The computer system to manage multi-user tools according to claim 1, wherein the local tool elements comprise an indicator that identifies the assigned pointer.

16. A computer-implemented method for managing multi-user tools comprising:
    detecting a plurality of identifiable pointers;
    identifying an infrared band on each of the plurality of identifiable pointers and assigning a pointer identifier to each of the plurality of identifiable pointers;
    generating a plurality of workspaces;
    associating one of the pointers by assigning one of the pointer identifiers to an account of one of the workspaces;
    generating a global tool element having a plurality of controls for authoring content with any of the plurality of identifiable pointers;
    displaying the global tool element on a touch-enabled display;

associating another pointer by assigning another one of the pointer identifiers to another account of one of the workspaces; and when more than one pointer is associated with one of the workspaces, automatically removing redundant controls from the global tool element and creating local tool elements each having the redundant controls, and each local tool element responding only to the assigned pointer identifier.

17. The computer-implemented method according to claim 16, further comprising displaying, on the touch-enabled display, the local tool elements at one of: the initial contact point on the touch-enabled display of the assigned pointer, above a receptacle where the assigned pointer was removed, and at a predetermined gesture of the assigned pointer following detection of the predetermined gesture.

18. The computer-implemented method according to claim 17, wherein the predetermined gesture is a swipe across an edge of a bezel of the touch-enabled display.

19. The computer-implemented method according to claim 16, further comprising storing, in a tangible computer-readable memory, modifications made by the assigned pointers to respective workspaces.

20. The computer-implemented method according to claim 19, further comprising periodically transferring the modifications stored in the tangible computer-readable memory to a content server.

21. The computer-implemented method according to claim 16, further comprising changing the workspace corresponding to the assigned pointer in response to the assigned pointer selecting a different workspace from a list of workspaces.

22. The computer-implemented method according to claim 21, further comprising an authentication of the assigned pointer with the different workspace prior to changing the workspace to the different workspace.

23. The computer-implemented method according to claim 22, wherein the authentication of the assigned pointer by receiving authorization from at least one pointer currently assigned to the different workspace.

24. The computer-implemented method according to claim 22, further comprising activating the different workspace.

25. The computer-implemented method according to claim 16, further comprising causing the global tool element and the local tool elements to recede from view on the touch-enabled display based on a frequency of use by the assigned pointers.

26. The computer-implemented method according to claim 16, further comprising causing the global tool element and the local tool elements to increase or decrease transparency on the touch-enabled display based on a frequency of use by the assigned pointers respectively.

27. The computer-implemented method according to claim 16, wherein the plurality of controls comprise at least one of a toolbar, a palette, or a radial tool; and wherein the toolbar, palette, and radial tool each has a plurality of control icons.

28. The computer-implemented method according to claim 27, wherein the plurality of control icons changes based on the workspace.

29. The computer-implemented method according to claim 16, wherein the local tool elements comprise an indicator that identifies an attribute of the assigned pointer.

30. A computing system for managing multi-user tools comprising:
a processor;
a touch-enabled display;
a tangible computer-readable memory comprising instructions to configure the processor to:
identify and associate at least one identifiable infrared band with at least one workspace;
retrieve profile information from the account and customize the at least one workspace based on the profile information;
generate a global tool element having a plurality of controls for authoring content with any of the plurality of identifiable infrared bands;
display the global tool element on the touch-enabled display; and
when more than one identifiable infrared band is assigned to the at least one workspace, create a local tool element for each identifiable infrared band by removing redundant controls from the global tool element, each local tool element accepting only input from the identifiable infrared band, display each local tool element on the touch-enabled display.

* * * * *